United States Patent [19]

Shedrow

[11] 4,349,251
[45] Sep. 14, 1982

[54] ADJUSTABLE EYEGLASS MOUNTING

[76] Inventor: Sidney Shedrow, 202 E. Gaston St., Savannah, Ga. 31401

[21] Appl. No.: 177,098

[22] Filed: Aug. 11, 1980

[51] Int. Cl.³ .......................... G02C 5/04; G02C 1/00; G02C 9/00
[52] U.S. Cl. .................................... 351/128; 351/41; 351/43; 351/47; 351/158
[58] Field of Search ...................... 351/41, 43, 47, 57, 351/128, 158, 133; 2/10, 199, 424

[56] References Cited

U.S. PATENT DOCUMENTS 3,787,113  1/1974  Shedrow .................. 351/43

Primary Examiner—Corbin John K.
Assistant Examiner—Rodney B. Bovernick
Attorney, Agent, or Firm—James B. Middleton

[57] ABSTRACT

Apparatus for fixing eyeglasses within a protective mask is disclosed, the eyeglasses being adjustable vertically. An attaching bar is fixed to the viewing glass of the mask, the attaching bar having two or more notches vertically spaced. A carrier has the eyeglasses attached, and the carrier has tabs to be received by the notches. The vertical position of the eyeglasses is fixed by selecting the appropriate notches.

9 Claims, 7 Drawing Figures

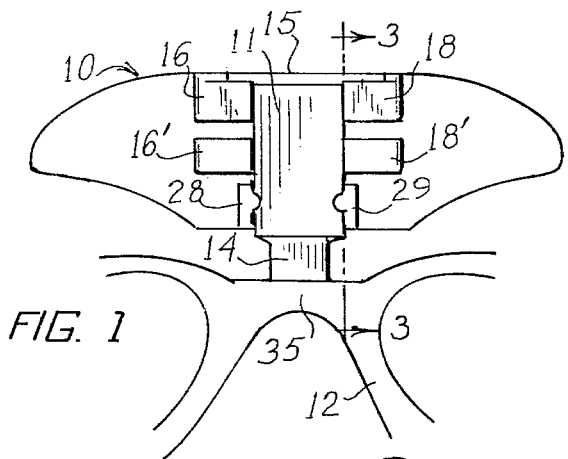
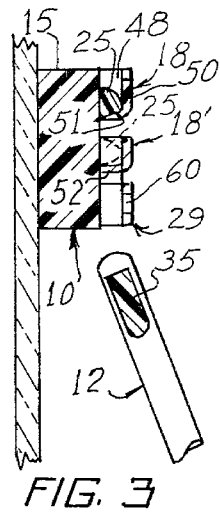
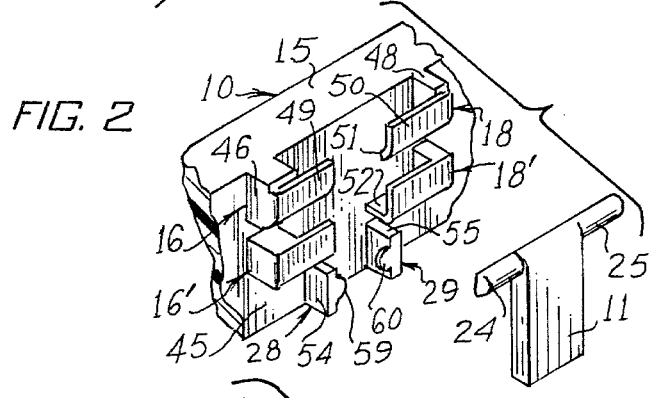
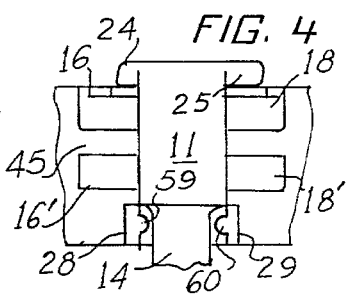
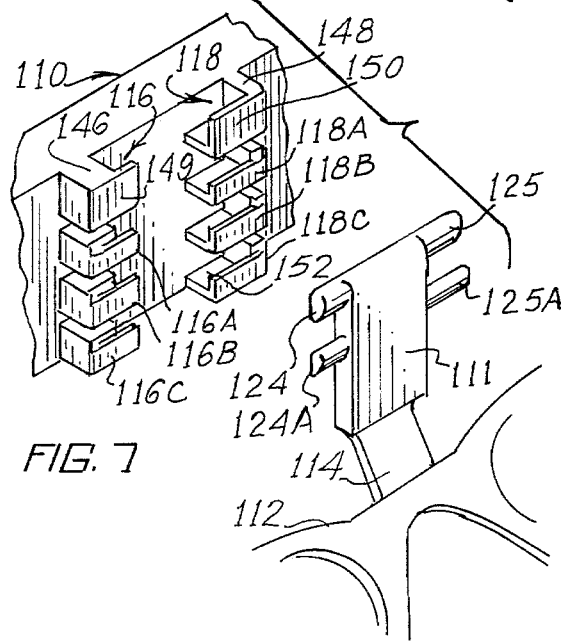
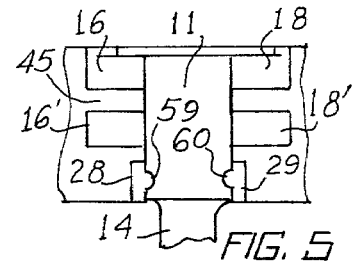
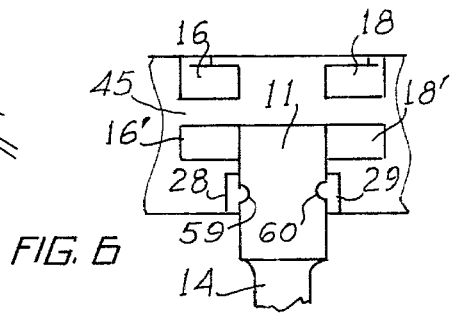

ADJUSTABLE EYEGLASS MOUNTING

FIELD OF THE INVENTION

This invention relates generally to eyeglass mounting means, and is more particularly concerned with means for mounting eyeglasses in a protective mask or the like, the mounting means providing for vertical adjustment of the eyeglasses with respect to the eyes of the wearer.

BACKGROUND OF THE INVENTION

This invention relates to, and constitutes an improvement over, the invention by the same inventor disclosed in U.S. Pat. No. 3,787,113, issued Jan. 22, 1974. In that patent, an eyeglass mounting means is disclosed wherein an attaching bar is fixed to the viewing glass of a protective mask, and a pair of eyeglasses is hinged to a carrier, the carrier being receivable by the attaching means. The patent further discloses a spacer to space the attaching means from the viewing glass of the mask in order to move the eyeglasses somewhat closer to the eyes of the person wearing the mask.

The above mentioned patent therefore discloses a mounting means for eyeglasses wherein the mounting means will angle the eyeglasses for proper pantoscopicity, and the mounting means can vary the positioning of the eyeglasses with respect to the viewing glass of the mask to locate the eyeglasses the desired distance from the eyes of the person wearing the mask. The problem with the previously patented device is that there is no means for adjusting the eyeglasses vertically with respect to the mask.

Protective masks are now used in a wide variety of environments, including of course underwater, but also including toxic environments and the like. Some of the present day masks are substantially full-face masks rather than simply eye-and-nose masks, and the full-face masks tend to fit different physiognomies in different ways. The result is that a mask must sometimes be placed higher on a person's head, and sometimes lower. Thus, if the attaching bar is placed in a mask appropriately for one person, the placement may be unusable for a different person. This is to say, the different person may not look through the optical centers of the lenses when his spectacles are carried by the attaching bar.

There have previously been some efforts at providing vertically adjustable eyeglasses within a mask, but the mounting means have not been sufficiently stable. The spectacles have generally been carried by a spring member, the eyeglasses being adjustable along the spring member, the eyeglasses being adjustable along the spring member. Such devices are also hazardous since there is a piece of spring steel very close to a person's eyes. Thus, the prior art has not provided a truly desirable eyeglass mounting with the needed vertical adjustment.

SUMMARY OF THE INVENTION

The present invention overcomes the above mentioned and other difficulties with the prior art by providing an attaching means to be fixed to the viewing glass of a mask, and a carrier for hingedly carrying a pair of eyeglasses. The carrier has a plurality of tabs extending therefrom to be selectively received within a plurality of notches on the attaching means. The plurality of notches on the attaching means includes notches at a plurality of horizontal levels so that the tabs extending from the carrier can be received at any desired level. As a result, the carrier is vertically adjustable with respect to the attaching means for a vertical variation in the positioning of the spectacle with respect to the viewing glass.

BRIEF DESCRIPTION OF THE DRAWINGS

These and other features and advantages of the present invention will become apparent from consideration of the following specification when taken in conjunction with the accompanying drawings in which:

FIG. 1 is a front elevational view showing the attaching means of the present invention having a carrier mounting thereon, and a pair of eyeglasses shown fragmentarily;

FIG. 2 is an exploded perspective view showing the arrangement for fixing the carrier to the attaching means;

FIG. 3 is a cross-sectional view taken substantially along the line 3—3 in FIG. 1;

FIGS. 4, 5 and 6 are sequential views illustrating the installation and adjustment of the carrier with respect to the attaching means; and, FIG. 7 is a view similar to FIG. 2 showing a modified form of the invention.

DESCRIPTION OF THE PREFERRED EMBODIMENTS

Referring now more particularly to the drawings, and to those embodiments of the invention here chosen by way of illustration, FIG. 1 shows the attaching means 10 having the carrier 11 fixed thereto. The carrier 11 has a hinge member 14 at the lower end thereof, the hinge member 14 being also attached to the bridge 35 of the eyeglasses 12. While it will be realized that numerous forms of hinges may be utilized in the device of the present invention, the hinge here shown is an integrally molded hinge member having a preset angle. Those skilled in the art will realize that nylon and other plastic materials can be injection molded to provide such a hinge which will allow easy movement, but have sufficient "memory" that they will always return to the same preset position.

The attaching means 10 as shown in FIG. 1 of the drawings includes a plurality of notch means 16 and 18 adjacent to the upper edge 15 of the attaching means 10. Somewhat below the notch means 16 and 18, there are similar notch means 16' and 18'; and, below the notch means 16' and 18' there is a pair of carrier stabilizers 28 and 29.

Referring now more particularly to FIGS. 2 and 3 of the drawings for a better understanding of the construction of the device, it will be seen that the attaching means 10 has a generally flat front face 45, though the rear face of the attaching means 10 can be virtually any shape to conform to the shape of a viewing glass. The front face 45 has the notch means 16 and 18 extending therefrom, and it is contemplated that the notch means 16 and 18 would be integrally molded with the attaching means 10.

In general, the notch means 16 and 18 include edge members 46 and 48 which extend generally perpendicularly from the face 45, and front members 49 and 50 which are parallel to the face 45. It will be seen that the notch members 16 and 18 are therefore somewhat L-shaped to confine tabs 24 and 25 both laterally and front to back.

It is desirable to provide structure that is not symmetrical so the carrier 11 cannot be put in backwards. In the device of the present invention, it will be seen that the carrier 11 is symmetrical about a vertical line, but the tabs 24 and 25 extend therefrom different amounts. Also, the notch means 16 is shallower than the notch means 18 so that the short tab 24 must necessarily be received within the notch means 16 and the longer tab 25 must necessarily be received within the notch means 18.

It will also be noticed that the notch means 16 and 18 do not have a complete bottom member; however, there is provided a detent means for holding the tabs 24 and 25 within the notch means 16 and 18 against inadvertent movement. Nevertheless, the detent is such that the tabs 24 and 25 can be forcefully moved past the detent means to be received within the notch means 16' and 18'.

As here shown, and as best seen in FIG. 3 of the drawings, the front walls 49 and 50 have their lowermost edge 51 turned slightly inwardly. The device herein shown would normally be made of a plastic material such as nylon so the notch means 16 and 18 would have a degree of elasticity. Because of this, the tabs 24 and 25 can be forcefully urged through the open bottom of the notch means 16 and 18, past the inwardly turned detent means 51, and down to the notch means 16' and 18'.

While the inwardly turned wall 51 serves the described purpose, those skilled in the art will realize that other forms of detent means may be used equally well, including a protrusion from the face 45 of the attaching means 10, or a lateral protrusion from the members 46 and 48 of the notch means 16 and 18. Even a very snug fit between the front walls 49 and 50 may serve to position and hold the tabs 24 and 25 as desired.

Since the notch means 16' and 18' are the lowest notch means in the embodiment shown in the drawings, it will be seen that these include solid bottoms 52. Otherwise, the structure of the notch means 16' and 18' is substantially the same as the structure of the notch means 16 and 18. It should be realized that the fit of the tabs within the notch means may be a tight fit to give the carrier sufficient stability both vertically and angularly. Obviously, the tabs 24 and 25 cannot move laterally because of the end walls 46 and 48, but a twist on the carrier 11 may force one tab upwardly from the notch means 16 or 18 allowing the eyeglasses to become misaligned. Sufficient snugness of the notch means could prevent such misalignment.

Alternatively, the device may include additional carrier stabilizers. The carrier stabilizers 28 and 29 are here shown as including projections 54 and 55 for engaging the carrier 11 at the two sides thereof, thereby providing lateral stability. A pair of fingers 59 and 60 extends from the projections 54 and 55 to overlie the edge of the carrier 11 to hold the carrier 11 against the face 45 of the attaching means 10.

With the foregoing description in mind, attention is directed to FIGS. 4, 5 and 6 of the drawings for an explanation of the operation of the device.

In FIG. 4 of the drawings, it will be seen that the carrier 11 will first be placed against the attaching means 10 with the tabs 24 and 25 above, but aligned with, the notch means 16 and 18. In this position, the fingers 59 and 60 extend towards each other but are in the vicinity of the hinge 14 which is somewhat narrower than the carrier 11. Because of this structure, the carrier 11 can be placed completely against the face 45 of the attaching means 10.

The next step will be to move the eyeglasses 12 with the hinge 14 and carrier 11 downwardly so that the tabs 24 and 25 engage within the notch means 16 and 18. It will of course be understood that the detent means 51 will stop the tabs 24 and 25 when the tabs 24 and 25 are fully seated within the notch means 16 and 18. This same motion causes the carrier to move downwardly sufficiently that the fingers 59 and 60 engage the carrier itself. As a result, the carrier 11 is held against vertical movement in the same plane as the face 45 by the notch means 16 and 18, the carrier 11 is held from lateral motion by the projections 54 and 55 as well as by the side walls of the notch means 16 and 18, and the carrier 11 is held from rotation about the tabs 24 and 25 by the fingers 59 and 60. It will therefore be seen that the carrier 11 is quite stably carried by the attaching means 10.

If the eyeglasses 12 need to be adjusted to a lower position, one would then exert additional force on the carrier 11, which would generally be done by exerting a force on the eyeglasses 12. This additional force can be exerted until the force of the detent 51 is overcome, and the carrier 11 will move downwardly until the tabs 24 and 25 are received in the notch means 16' and 18'. Once the tabs 24 and 25 are against the bottom surface 52 of the notch means 16' and 18' the carrier 11 will not move further. Again, it will be seen that tabs 24 and 25 are held by the notch means 16' and 18' and the carrier 11 is also held by the stabilizers 28 and 29 in both a lateral direction and a forward direction. Because of this, one of the notch means can be eliminated if desired when the additional carrier stabilizers are used.

When the eyeglasses 12 are to be removed from the attaching means 10, the force will simply be reversed so that the carrier 11 will move upwardly from the position shown in FIG. 6, through the positon shown in FIG. 5 and finally to the position shown in FIG. 4 wherein the carrier 11 can be removed from the attaching means 10.

A modified form of the present invention is shown in FIG. 7 of the drawings. Since the device shown in FIG. 7 is quite similar to the device shown in FIGS. 1–6, only a brief description is thought to be necessary.

In the device shown in FIG. 7 of the drawings, it will be seen that there is an attaching means 110, and there is a plurality of notch means designated at 116, 116A, 116B and 116C on one side, and notch means 118, 118A, 118B and 118C on the other side. Each of these notch means 116 and 118 is formed with an extending end wall 146 and 148, a front wall 149 and 150, and bottom 152.

For cooperation with the notch means 116 and 118, the eyeglasses 112 have the hinge 114 as previously described, and a carrier 111. The carrier 111 has a plurality of tabs extending therefrom. At one edge of the carrier 111 there are tabs 124 and 124A, and at the opposite edge of the carrier 111 there are tabs 125 and 125A. It will therefore be seen that the tabs 124 and 124A will be received within any selected two of the notch means 116, 116A, 116B and 116C while the tabs 125 and 125A would be received within the complementary notch means 118, 118A, 118B and 118C.

In view of this arrangement wherein two tabs extend from each side of the carrier 111 to be received in two notch means, it will be understood that no additional stabilizing means will be required. While the device shown in FIG. 7 is somewhat more elaborate in construction, the requirement for more positive insertion and removal may at times be desirable.

From the foregoing, it should now be seen that the device of the present invention provides an extremely simple means for allowing a pair of eyeglasses to be adjusted vertically with respect to an attaching means 10 that has been fixed to a mask. It will be understood by those skilled in the art that the vertical adjustment required would be in the vicinity from 3 to 7 millimeters, so that attaching means 10 does not have to be excessively large. Also, both embodiments of the invention as here shown can be molded in unitary pieces with no subsequent assembly. The device is otherwise simple both to make and to use, and the eyeglasses are adequately fixed in position as desired, but movable with intentional effort for the desired adjustment.

It will therefore be understood by those skilled in the art that the particular embodiments of the invention here presented are by way of illustration only and are meant to be in no way restrictive; therefore, numerous changes and modifications may be made, and the full use of equivalents restored to, without departing from the spirit or scope of the invention as defined in the appended claims.

I claim:

1. Eyeglasses mounting means, wherein attaching means is fixed in a mask and eyeglasses are selectively fixable to said attaching means, said mounting means including a plurality of notch means vertically spaced on said attaching means, a carrier, said carrier having said eyeglasses hinged thereto, at least one tab extending from said carrier for being received by a selected one of said plurality of notch means, said at least one tab including a first tab extending from one side of said carrier and a second tab extending from the opposite side of said carrier, said plurality of notch means including a first plurality of notch means adapted selectively to receive said first tab and a second plurality of notch means adapted selectively to receive said second tab.

2. Eyeglass mounting means as claimed in claim 1, said carrier including a generally flat member receivable against said attaching means and between said notch means, at least one notch means of said first plurality of notch means including a first detent for holding said first tab within said at least one notch means, said detent being insufficient to hold said tab against forceful movement.

3. Eyeglass mounting means as claimed in claim 2, and further including a carrier stabilizer, said carrier stabilizer comprising projections immediately adjacent to said carrier for preventing lateral motion of said carrier.

4. Eyeglass mounting means as claimed in claim 3, said carrier stabilizer further including a finger on at least one of said projections, said finger being located to overlie said carrier when said carrier is fixed to said attaching means.

5. Eyeglass mounting means as claimed in claim 4, said first tab being shorter than said second tab, said first plurality of notch means being shallower than said second plurality of notch means.

6. Eyeglass mounting means as claimed in claim 1, and further including a third tab extending generally parallel to said first tab and a fourth tab extending generally parallel to said second tab, said fist tab and said third tab being simultaneously receivable within said first plurality of notch means, and said second tab and said fourth tab being simultaneously receivable within said second plurality of notch means.

7. Eyeglass mounting means as claimed in claim 1, said carrier being receivable against said attaching means and vertically movable with respect thereto, said plurality of notch means being located immediately adjacent to said carrier for selectively fixing the vertical location of said carrier.

8. Eyeglass mounting means as claimed in claim 7, and further including carrier stabilizer means for preventing lateral motion of said carrier.

9. Eyeglass mounting means as claimed in claim 8, said stabilizer means including projections carried by said attaching means immediately adjacent to said carrier.

* * * * *